United States Patent [19]

Takauchi

[11] Patent Number: 4,708,074

[45] Date of Patent: Nov. 24, 1987

[54] DEVICE FOR GENERATING STITCH FORMING DATA IN A SEWING MACHINE

[75] Inventor: Mitsuyoshi Takauchi, Yamagata, Japan

[73] Assignee: Happy Industrial Corporation, Yamagata, Japan

[21] Appl. No.: 890,913

[22] Filed: Jul. 28, 1986

[30] Foreign Application Priority Data

Oct. 19, 1985 [JP] Japan .................................. 60-235522

[51] Int. Cl.[4] ............................................. D05B 3/02
[52] U.S. Cl. .................................................... 112/453
[58] Field of Search ............... 112/453, 454, 456, 457, 112/458, 266.1

[56] References Cited

U.S. PATENT DOCUMENTS

| 4,214,543 | 7/1980 | Garron et al. | 112/453 X |
| 4,221,177 | 9/1980 | Makabe et al. | 112/457 |
| 4,236,468 | 12/1980 | Eguchi | 112/458 |
| 4,282,821 | 8/1981 | Watanabe et al. | 112/457 |

*Primary Examiner*—Peter Nerbun
*Attorney, Agent, or Firm*—Burgess, Ryan & Wayne

[57] ABSTRACT

In the present invention, two stitch control signals are memorized in each address, one of these stitch control signals is used as an address signal, the other signal is used as a stitch control signal in its address, and this address signal is the next stitch control signal. Therefore, when the next stitch control signal is an address signal of the stitch control signal to be executed then, the discrimination in a data selector becomes fast and the motion for sending the stitch control signals is quickly executed.

1 Claim, 5 Drawing Figures

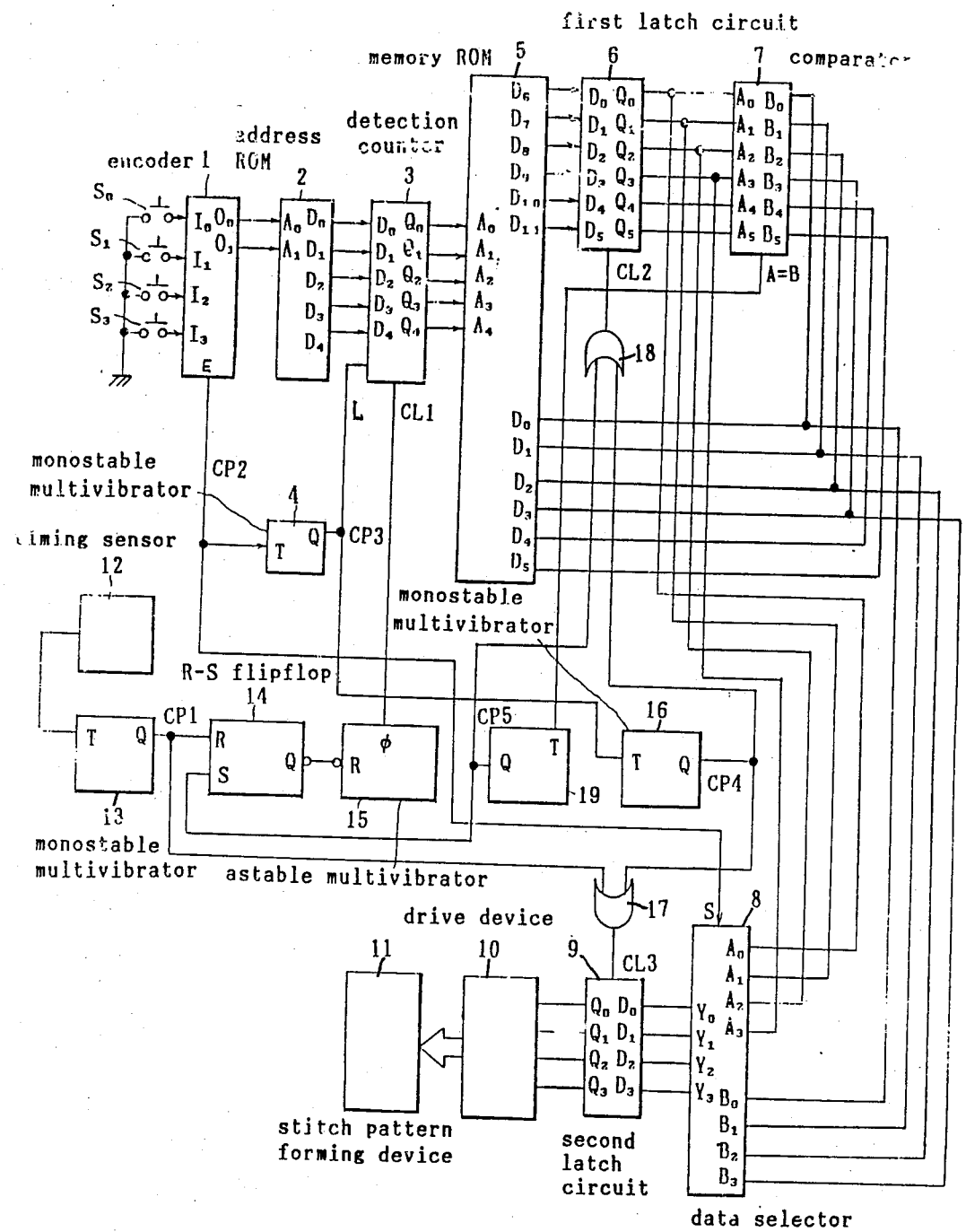
F I G. 1

Table 1

| selection switch | output of encoder | |
|---|---|---|
| | $O_0$ | $O_1$ |
| $S_0$ | 0 | 0 |
| $S_1$ | 0 | 1 |
| $S_2$ | 1 | 0 |
| $S_3$ | 1 | 1 |

Table 2

| address | data | $D_4$ | $D_3$ | $D_2$ | $D_1$ | $D_0$ |
|---|---|---|---|---|---|---|
| 0 | | 0 | 0 | 0 | 0 | 0 |
| 1 | | 0 | 0 | 0 | 0 | 1 |
| 2 | | 0 | 0 | 0 | 1 | 1 |
| 3 | | 0 | 1 | 0 | 0 | 1 |

Table 3

| | data address | $D_{11}$ | $D_{10}$ | $D_9$ | $D_8$ | $D_7$ | $D_6$ | $D_5$ | $D_4$ | $D_3$ | $D_2$ | $D_1$ | $D_0$ |
|---|---|---|---|---|---|---|---|---|---|---|---|---|---|
| pattern 1 | 0 | 0 | 0 | 0 | 1 | 1 | 1 | 0 | 0 | 0 | 1 | 1 | 1 |
| pattern 2 | 1 | 0 | 0 | 0 | 1 | 1 | 1 | 0 | 0 | 0 | 0 | 0 | 0 |
| | 2 | 0 | 0 | 0 | 0 | 0 | 0 | 0 | 0 | 0 | 1 | 1 | 1 |
| pattern 3 | 3 | 0 | 0 | 0 | 1 | 0 | 1 | 0 | 1 | 0 | 0 | 0 | 0 |
| | 4 | 0 | 0 | 1 | 0 | 1 | 0 | 0 | 1 | 0 | 1 | 0 | 1 |
| | 5 | 0 | 1 | 1 | 1 | 1 | 1 | 0 | 0 | 1 | 0 | 1 | 0 |
| | 6 | 0 | 1 | 1 | 0 | 1 | 0 | 0 | 1 | 1 | 1 | 1 | 1 |
| | 7 | 0 | 1 | 0 | 1 | 0 | 1 | 0 | 1 | 1 | 0 | 1 | 0 |
| | 8 | 0 | 1 | 0 | 0 | 0 | 0 | 0 | 1 | 0 | 1 | 0 | 1 |
| pattern 4 | 9 | 1 | 0 | 1 | 1 | 1 | 1 | 0 | 0 | 0 | 0 | 0 | 0 |
| | 10 | 0 | 0 | 0 | 0 | 1 | 0 | 1 | 0 | 1 | 1 | 1 | 1 |
| | 11 | 0 | 0 | 1 | 1 | 0 | 1 | 0 | 0 | 0 | 1 | 1 | 0 |
| | 12 | 0 | 0 | 1 | 1 | 0 | 1 | 0 | 0 | 1 | 1 | 0 | 1 |
| | 13 | 0 | 0 | 1 | 0 | 1 | 1 | 0 | 0 | 1 | 0 | 1 | 0 |
| | 14 | 0 | 0 | 0 | 1 | 1 | 0 | 0 | 0 | 1 | 0 | 1 | 1 |
| | 15 | 0 | 0 | 1 | 0 | 0 | 1 | 0 | 0 | 0 | 1 | 1 | 0 |
| | 16 | 0 | 0 | 1 | 0 | 0 | 0 | 0 | 0 | 1 | 0 | 0 | 1 |
| | 17 | 0 | 1 | 0 | 1 | 1 | 1 | 0 | 0 | 1 | 0 | 0 | 1 |
| | 18 | 1 | 0 | 0 | 0 | 0 | 0 | 0 | 1 | 0 | 1 | 1 | 1 |

Table 4

| $D_{11}$ $D_{10}$ | $D_9$ $D_8$ $D_7$ $D_6$ | $D_5$ $D_4$ | $D_3$ $D_2$ $D_1$ $D_0$ |
|---|---|---|---|
| discriminative data | next stitch control signals | discriminative data | stitch control signals |

FIG. 5

DEVICE FOR GENERATING STITCH FORMING DATA IN A SEWING MACHINE

BACKGROUND OF THE INVENTION

The present invention relates to a device for generating stitch forming data in a sewing machine by relative movement between a needle and a workpiece.

In a device for generating stitch forming data in the prior art, the stitch forming data are memorized in the memory medium of a magnetic tape or a punch tape and the memorized data are read out by driving the memory medium with a mechanical drive device in response to reading out signals in synchronization with the reciprocal movement of a sewing needle. The stitch forming data read out from the medium are applied to drive means for driving a needle and a feed device of a work as a command signal, whereby predetermined stitches are formed on the work.

However, in a reading period when the stitch forming data are applied to the driving device after the reading signals are generated, that is, in the period when the mechanical driving means drives the memory medium, if the sewing machine is driven faster than a speed at which the mechanical drive means responds to the reading signals, the stitch forming data are not read out in synchronization with the reciprocal movement of the needle.

In order to eliminate this defect, a sewing machine is known, in which a driving device is operatively connected to impart movement to a stitch forming instrumentality over said predetermined range of positions in response to stitch pattern signals. The apparatus includes a pulse generator driven in timed relation with the sewing machine for producing an effective timing pulse between stitches, a counter responsive to the timing pulses from the pulse generator for producing output control signals in a progressive numerical code, a static memory means for storing a data group capable of being summed every combination of which is unique, means responsive to the progressive numerical code of the control signals provided for extracting the data groups from the static memory, means for summing each data group extracted from said static memory, and means effective to impress on the driving device a stitch pattern signal corresponding to summation of each different data group extracted in response to said progressive numerical code of control signals (see U.S. Pat. No. 3,855,956).

In the prior sewing machine, however, the response to selection of the stitch pattern is late, because the control signals for extracting the data groups are progressive numerical codes repeatedly counted in the counter and the counter must repeatedly count for selecting one data group memorized in the static memory.

SUMMARY OF THE INVENTION

It is therefore an object of the present invention to provide a device for generating stitch forming data in a sewing machine in which the discrimination for selecting control signals is fast and the execution for forming stitches is fast.

It is another object of the present invention to provide a device for generating stitch forming data in a sewing machine in which the stitch control signals of one group having the next stitch control signals as an address signal are memorized in each address of a static memory, and thus the stitch control signals are applied to a drive device the instant that timing pulses are received.

In the present invention, two stitch control signals are memorized in each address, one of these stitch control signals is used as an address signal, the other signal is used as a stitch control signal at its address, and this address signal is the next stitch control signal. Therefore, when the next stitch control signal is an address signal of the stitch control signal to be executed then, the discrimination in the data selector becomes fast and the motion for sending the stitch control signals is quickly executed.

In order to accomplish the above and other objects, the present invention comprises a device for generating stitch forming data in a sewing machine by the motion of a needle corresponding to the feed of a work fabric comprising a plurality of switches for selecting a plurality of stitch patterns, an encoder for producing encoded signals by the selection of the switches, an address ROM for producing a start address by the encoded signals from said encoder, a detection counter for adding pulse signals from an astable multivibrator to the start address from the address ROM, a memory ROM for memorizing pairs of stitch control signals and next stitch control signals in each address and for recovering the stitch control signals and next stitch control signals by the output signals from the detection counter, a first latch circuit for latching the next stitch control signals from said memory ROM, a comparator for comparing the next stitch control signals in said first latch circuit with the stitch control signals produced in said memory ROM by the counting signals of the detection counter, a data selector for applying the stitch control signals from said memory ROM and for applying the next stitch control signals latched in said latch circuit by applying a pulse to said detecting counter, a second latch circuit for latching the stitch control signals from said data selector in turn, a drive means controlled by the stitch control signals from the second latch circuit, and a stitch forming means driven by said drive means.

The other features and advantages of the present invention will be apparent from the following description in reference to the attached drawings.

BRIEF DESCRIPTION OF THE DRAWINGS

FIG. 1 shows a block diagram of a device for generating stitch forming data in a sewing machine according to one form of the present invention;

FIG. 5 shows the relation between the data and the address of the devices in FIG. 1.

DESCRIPTION OF THE PREFERRED EMBODIMENT

Figure 2:
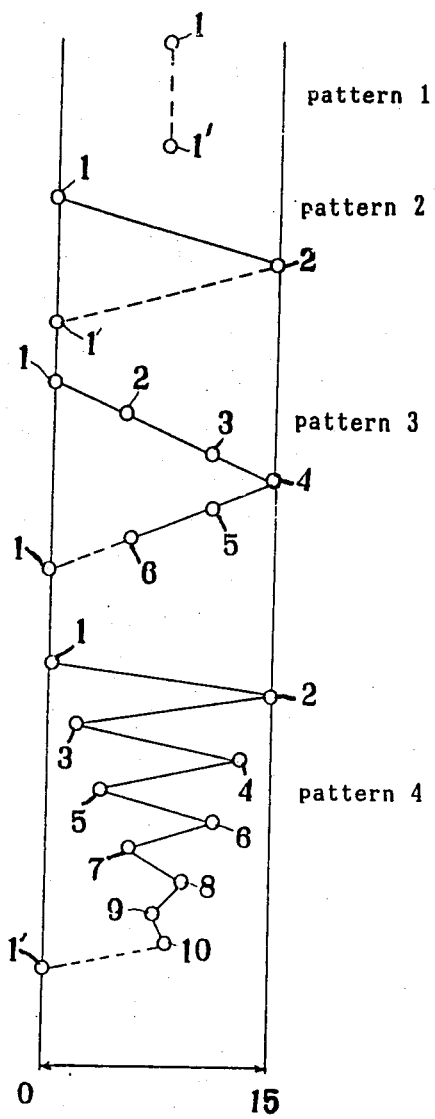
FIG. 2 shows concrete stitch patterns according to the present invention.

Referring to FIG. 1, a device for generating stitch forming data in a sewing machine according to the present invention is shown. In FIG. 1, pattern selection stitches $S_0 \sim S_3$ are arranged on a panel of a sewing machine and a pattern 1 to a pattern 4 as shown in FIG. 2 are selected by the pattern selection switches $S_0 \sim S_3$ respectively. Each one of the terminals of the pattern selection switches $S_0 \sim S_3$ is connected to ground and the other is connected to each of the input terminals $I_0 \sim I_3$ of an encoder 1, respectively. The output terminals $O_0 \sim O_1$ of the encoder 1 are connected to the input terminals $A_0 \sim A_1$ of an address ROM 2. When one of the pattern selection switches is pushed, the outputs as shown in the table 1 of FIG. 5 are produced from the output $O_0 \sim O_1$ of the encoder 1. For example, when the switch $S_0$ is switched on, the outputs $O_0 \sim O_1$ of the encoder 1 becomes 0 respectively. The output terminal E of the encoder 1 produces "1" when one of the switches is pushed and the output E produces "0" when one of the switches is pushed. The output terminals $D_0 \sim D_4$ are connected to the input terminals $D_0 \sim D_4$ of a detection counter 3.

On one hand, the output terminal E of encoder 1 is connected to the trigger terminal T of a monostable multivibrator 4 and the output terminal Q of the monostable multivibrator 4 is connected to the input terminal L of detection counter 3. When the pulse from terminal E change from "0" to "1" and is applied to the trigger terminal T, only one pulse is produced from the output terminal Q of the monostable multivibrator. The detection counter 3 consists of a 5 bit progressive up-counter and the output terminals $Q_0 \sim Q_4$ of the detection counter 3 are connected to the address input terminals $A_0 \sim A_4$ of a memory ROM 5. When the output in the load terminal L of the detection counter 3 is changed from "1" to "0", the data in the input terminals $D_0 \sim D_4$ are loaded and the detection counter 3 counts up from its counted value by the step-down of the pulse applied to the clock input terminal CL1 of the detection counter 3. The data output terminals $D_6 \sim D_{11}$ of the memory ROM 5 are connected to the input terminals $D_0 \sim D_5$ of a first latch circuit 6 and the data output terminals $D_0 \sim D_5$ of the memory ROM 5 are connected to the input terminals $B_0 \sim B_5$ of a comparator 7. The terminals $D_0 \sim D_3$ in the terminals $D_0 \sim D_5$ of the memory 5 are also connected to the input terminals $B_0 \sim B_3$ of the data selector 8. The output terminals $Q_0 \sim Q_5$ of the first latch circuit 6 are connected to the input terminals $A_0 \sim A_5$ of the comparator 7 and the output terminals $Q_0 \sim Q_3$ of the latch circuit 6 are connected to the inputs $A_0 \sim A_3$ of the data selector 8. The output terminals $Y_0 \sim Y_3$ of the data selector 8 are connected to the input terminals $D_0 \sim D_3$ of a second latch circuit 9 and its output terminals $Q_0 \sim Q_3$ are connected to a drive circuit 10. The output terminals of drive circuit 10 are connected to a stitch pattern forming device 11.

Figure 3:
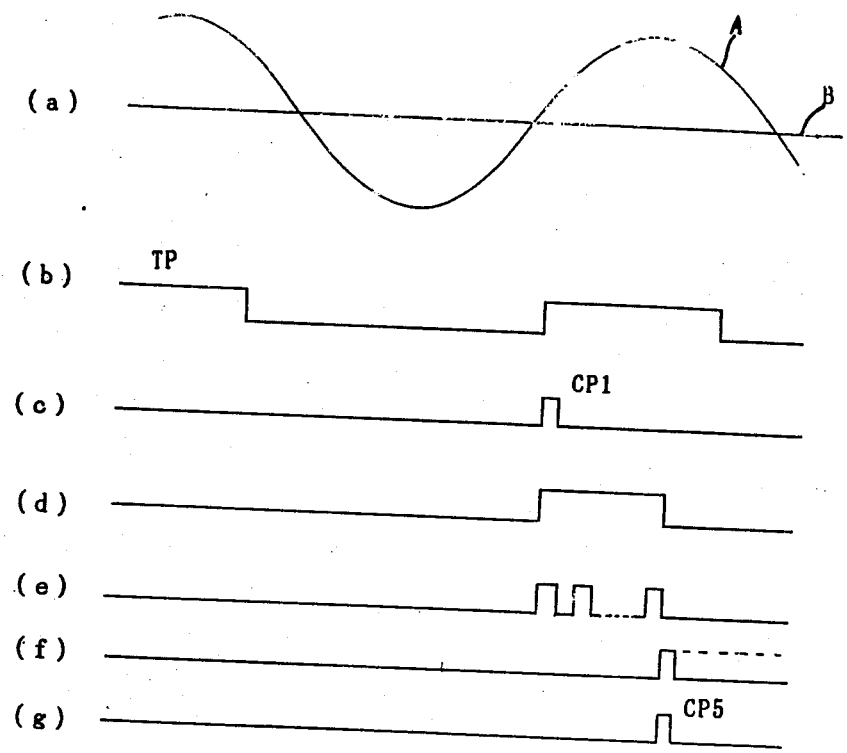
FIGS. 3 and 4 show timing charts of the output of each portion of the device in FIG. 1.

A timing sensor 12 produces the synchronous signals of the main shaft of a sewing machine. As shown in FIG. 3 (a), the timing sensor 12 produces "1" when the height A of a needle of the sewing machine is positioned above the needle board. The output of the timing sensor 12 is shown by TP in FIG. 3 (b). The output signal TP from the timing sensor 12 is applied to the trigger terminal T of a monostable multivibrator 13 and the signal CP1 {see FIG. 3 (c)} from the output terminal Q of monostable multivibrator 13 is applied to the reset input terminal R of an R-S flipflop 14. When the plus pulse is applied to the reset terminal R of the R-S flipflop 14, the output of its output terminal Q becomes "1" and the signal "1" as shown in FIG. 3 (d) is produced. The output terminal φ of an astable multivibrator 15 is connected to the clock input terminal CL1 of the detection counter 3. When a logic "0" is applied to the reset input terminal R, the astable multivibrator 15 is reset and is not vibrated and its output is "0". When a logic "0" is applied to the reset terminal R of the astable multivibrator 15, the pulses of a constant frequency are produced from the output terminal φ of the astable multivibrator 15 as shown in FIG. 3 (e). The trigger input terminal T of a monostable multivibrator 16 is connected to the output terminal Q of the monostable multivibrator 4. The output terminal Q of the monostable multivibrator 16 is connected to one input terminal of OR gates 17, 18. The other input terminal of the OR gate 17 is connected to the output terminal Q of the monostable multivibrator 13 and the output terminal of the OR gate 17, to the clock input terminal CL3 of the second latch circuit 9. The other input terminal of the OR gate is connected to the set input terminal S of the R-S flipflop 14 and the output terminal of the OR gate 18, to clock input terminal CL2 of the first latch circuit 6. The trigger input terminal T of the monostable multivibrator 19 is connected to the output terminal A=B of the comparator 7 and its output terminal, to the set terminal S of the R-S flipflop 14 and to one input terminal of the OR gate 18. When the pulse changing from "0" to "1" is applied to the trigger input terminals of the monostable multivibrators 16 and 19, positive going pulses are produced from these output terminals Q of the multivibrators 16 and 19.

Figure 4:
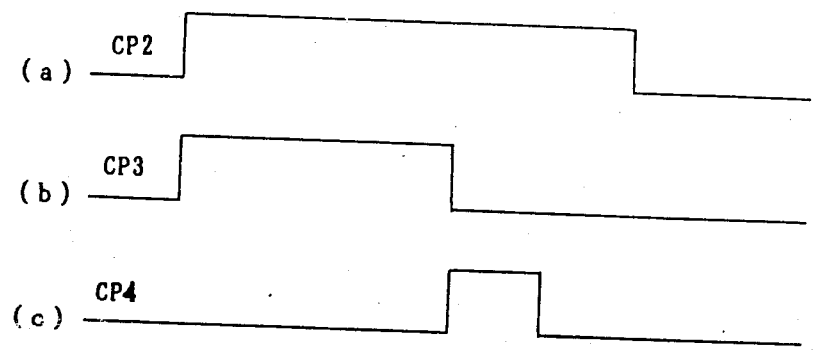

The stitch pattern selection operation mode of the present embodiment is explained according to FIGS. 2~4. FIG. 2 shows concrete stitch patterns and the patterns 1~4 correspond to the pattern selection switches $S_0 \sim S_3$. The horizontal axis in FIG. 2 has positions 0 to 15 in decimal scale. Therefore, these positions are shown by 4 bits in binary scale. When one switch (e.g. $S_2$) in the pattern selection switches $S_0 \sim S_3$ is pushed, the signals "1, 0, 1" are produced from the output terminals $O_0$, $O_1$ and E of the encoder 1. The output terminal E of the encoder 1 produces "1" when any one of the pattern selection switches $S_0 \sim S_3$ is pushed. Also, this data is made as a numeral of the suffix of the numerical order of the pattern selection switch binary produced from the output terminals $O_0$ and $O_1$ of the encoder 1. Then, since the outputs "0 and 1" of the output terminals $O_1$ and $O_0$ as shown in table 2 of FIG. 5 are applied to the input terminals $A_1$ and $A_0$ of the address ROM 2, the head address "00011" in the table 3 of FIG. 5 are produced from the output terminals $D_4 \sim D_0$. When the output pulse CP2 becomes "1" as shown in FIG. 4 (a), the pulse CP3 is produced from the output terminal Q of monostable multivibrator 4 as shown in FIG. 4 (b). Also, the output of the output terminal E of the encoder 1 is applied to the selection input terminal S of the data selector 8, and then the data applied to the input terminals $B_0 \sim B_3$ of the data selector 8 are produced from the output terminals $Y_0 \sim Y_3$. When the output pulse CP3 from the output terminal Q of the multivibrator 4 is applied to the input terminal L of the detection counter 3, the data "00011" are set in and produced from the output terminals $Q_0 \sim Q_4$ of the detection counter 3. The data "00011" are applied to the address input terminals $A_0 \sim A_4$ of memory ROM 5 and the data of address 3 of the pattern 3 in the table 3 of FIG. 5 are produced from the output terminals $D_0 \sim D_{11}$ of the memory ROM 5.

The contents as to the tables 3 and 4 in FIG. 5 are explained. The table 3 shows the data memorized in the memory ROM 5 by binary scale, and these data show only the data for controlling the bite of the sewing needle. For example, in the pattern 3, one cycle of the bite of the needle has the data 0, 5, 10, 15, 10, 5 in decimal scale and continuous patterns are formed by the repeat of these data. In the table 4 of FIG. 5, the discriminative data are provided for discriminating the stitch control signals from each other when these stitch control signals have the same data. In the table 4, since the data $D_4$ and $D_5$ are two bits, the four data bits of the same stitch control signals can be discriminated respectively. When the number of the discriminative data is increased, the number of the same stitch control signals is increased. The stitch control signals $D_0 \sim D_3$ of the addresses 1, 3 and 9 are 0, but the same stitch control signals are discriminated by changing the discriminative data $D_4$ and $D_5$.

In the bits $6 \sim 9$ ($D_6 18\ D_9$), the next stitch control signals are memorized, and in bits 10 and 11 ($D_{10}$ and $D_{11}$), the discriminative data are memorized. The next stitch control signals in the pattern 3 are explained hereinafter. The one cycle of the pattern 3 is formed by six stitches $1 \sim 6$ in the pattern 3 of FIG. 2. The stitch control signals $1 \sim 6$ of the pattern 3 are memorized in the addresses $3 \sim 8$ of the table 3 in FIG. 5. That is, the stitch 1 in the pattern 3 is sewn by the data "0000" ($D_0 \sim D_3$) in the address 3 of the pattern 3 as shown in FIG. 5. Then, data $D_9 \sim D_6$ in the address 3 memorize the stitch control signals "0101" of the next stitch 2 of the pattern 3. Therefore, when the next stitch control signals "0101" are detected, the stitch 2 in the pattern 3 is sewn by the data "0101" ($D_3 \sim D_0$) in the address 4 of the pattern 3 as shown in FIG. 5. Also, data $D_9 \sim D_6$ in the address 4 memorize the stitch control signals "1010" of the next stitch 3 of the pattern 3. Therefore, when the next stitch control signals "1010" are detected, the stitch 3 in the pattern 3 is sewn by the data "0101" ($D_3 \sim D_0$) in the address 5 of the pattern 3. The stitches $4 \sim 6$ in the pattern 3 are detected by the next stitch control signals in turn, and are sewn by the data "1111", "1010" and "0101" in the addresses $6 \sim 8$ of the pattern 3 as shown in FIG. 5 in turn. The next stitch to the stitch 6 is returned to the stitch 1.

As stated above, the stitch control signals and the next control signals are memorized in one address. In the table 3 of FIG. 5, the control signals of the next stitch are memorized in the next address for easy explanation, but even if the control signals of the next stitch are memorized in a random address, the patterns as shown in FIG. 2 can be formed.

When the pulse CP4 as shown in FIG. 4 (c) is produced from the output terminal Q of the monostable multivibrator 16 by the step down of pulse CP3 from the output terminal Q of the monostable multivibrator 4, the pulse CP4 is applied through OR gate 17 to the clock input terminal CL3 of the second latch circuit 9. Then, the data of the input terminals $B_0 \sim B_3$ are produced from the output terminals $Y_0 \sim Y_3$. That is, these data of the input terminals $B_0 \sim B_3$ is the data of the output terminals $D_0 \sim D_3$ of the memory ROM 5 or the data "0000" of $D_0 \sim D_3$ of the address 3 in the table 3. When these data are applied to the drive device 10, the first stitch pattern of the pattern 3 as shown in FIG. 2 is formed by the pattern forming device 11. Also, since the output pulse CP4 from the output terminal Q of the monostable multivibrator 16 is applied through the OR gate 18 to the clock input terminal CL2 of the first latch circuit 6, the data of the stitch 2 of the pattern 3 in FIG. 2 are memorized in the first latch circuit 6.

When the main shaft of the sewing machine is rotated, the operation to select the stitch pattern is explained by FIG. 3. As stated above, FIG. 3 shows the timing chart of the outputs of the portions of FIG. 1. FIG. 3 (a) shows the height A of the sewing needle and FIG. 3 (b) shows the output pulse TP. When the pulse TP which is changed from "0" to "1" is applied to the trigger input terminal T of the monostable multivibrator 13, the positive-going pulse CP1 is produced from the output terminal of the monostable multivibrator 13. This pulse CP1 is applied through the OR gate 17 to the clock input terminal CL3 of the second latch circuit 9. Then, if the data of the stitch 1 of the pattern 3 in FIG. 2 is selected to the other pattern is not selected, since an output is not produced from the output terminal of the encoder 1, "0" is applied to the input terminal S of the data selector 8. Therefore, the data of the input terminals $A_0 \sim A_3$ of the data selector 8 or the data output terminals $Q_0 \sim Q_3$ of the first latch cicuit 6 are applied to the data output terminals $Y_0 \sim Y_3$ of the data selector 8. Since the data of the output terminals $Y_0 \sim Y_3$ are applied to the second latch circuit 9 and then to the drive device 10, the data of the stitch 2 of the pattern 3 in FIG. 2 or the data of the next latch control signals are produced with no detection of the next stitch 2. Also, since the pulse CP1 produced from the output terminal Q of the monostable multivibrator 13 is applied to the reset input terminal R of the R-S flipflop 14 circuit, the output of the output terminal Q of the R-S flipflop 14 becomes "1" as shown in FIG. 3 (d). Then, since "1" is applied to the reset input terminal R of the astable multivibrator 15, the astable multivibrator 15 starts its oscillation and the pulses are applied from output terminal $\phi$ of the astable multivibrator 15 to the clock input terminal CL1 of the detection counter 13.

Then, when the pattern 3 is selected by the pattern selection switch $S_2$, "00011" in binary scale (3 in decimal scale) are set in the output terminals $Q_0 \sim Q_3$ of the detection counter 3. Also, since the first latch circuit 6 memorizes "000101" (binary scale) of $D_{11} \sim D_6$ in the address 3 of the table 3 in FIG. 5. These data "000101" are compared with the data "000010" (binary scale) of $D_0 \sim D_5$ in the address 3 and the pulses from the astable multivibrator 15 are applied to the detection counter 3 till the data "000010" corresponds with the data "000101". The data of $D_0 \sim D_5$ in the pattern 3 which coincide with data "000101" are in the address 4. Therefore, when one pulse is applied to the clock terminal CL1 of the detection counter 3, the output of the detection counter 3 becomes "000101" and the data of the address 4 of the table 3 are produced. The data of $D_0 \sim D_5$ of the address 4 are applied to the output terminal $D_0 \sim D_5$ of the memory ROM 5 and then to the input terminal $B_0 \sim B_5$ of the comparator 7. Then, the data of the input terminals $B_0 \sim B_5$ are the same as the data of the other input terminals $A_0 \sim A_5$ in "000101". Therefore, the output signal of the output terminal A=B of the comparator 7 changes from "0" to "1". This signal is applied to the trigger iput terminal T of the monostable multivibrator 19, and the pulse signal CP5 as shown in FIG. 3 is produced. This pulse signal CP5 is applied to the set input terminal S of the flipflop 14 to be set. Therefore, the output signal of the output terminal Q of the flipflop 14 becomes "0" and the astable multivibrator 15 is reset and its oscillation is stopped. The pulse signal CP5 produced from the output terminal Q of the monostable multivibrator 19 is applied through the OR gate 18 to the clock input terminal CL2 of the first latch circuit 16. By this, the data "001010" of $D_{11} \sim D_6$ of the address 4 in the pattern 3 are latched in the first latch circuit 6. These data "001010" are the same as the data of $D_0 \sim D_5$ in the address 5 of the pattern 3.

As stated above, the pulses CL1 from the output terminal $\phi$ of the astable multivibrator 15 are applied to the detection counter 3 till the stitch control signals produced from the output terminals $D_0 \sim D_5$ of the memory ROM 5 correspond to the next stitch control signals memorized in the first latch circuit 6, and the next stitch control signals are selected. Therefore, when one pattern is selected by the selection of any one of the pattern selection switches $S_0 \sim S_3$, the stitch control signals in this selected pattern are produced from random addresses of the memory ROM 5 and are sewn in turn.

What is claimed is:

1. A device for generating stitch forming data in a sewing machine to control the motion of a needle corresponding to the feed of a work fabric, comprising:

a plurality of switches for selecting a plurality of stitch patterns;

encoder means for producing encoded signals by the selection of the switches;

address means for producing a start address by the encoded signals from said encoder means;

detection counter means for adding pulse signals from an astable multivibrator to the start address from counting the address means to produce output signals;

memory means for memorizing pairs of stitch control signals and next stitch control signals in each address thereof, and for recovering the stitch control signals and next stitch control signals in response to the counting output signals from the detection counter means;

first latch means for latching the next stitch control signals from said memory means;

comparator means for comparing the next stitch control signals in said first latch means with the stitch control signals recovered by said memory means in response to the counting output signals of the detection counter means;

data selector means for applying the stitch control signals from said memory means, and for applying the next stitch control signals latched in said first latch means by applying a pulse to said detecting counter means;

second latch means for latching the stitch control signals from said data selector means in turn;

drive means controlled by the stitch control signals from the second latch means; and stitch forming means driven by said drive means.

* * * * *